United States Patent
Ishiguro et al.

(10) Patent No.: US 12,370,788 B2
(45) Date of Patent: Jul. 29, 2025

(54) METHOD FOR MANUFACTURING LAMINATE, METHOD FOR MANUFACTURING COATED ARTICLE, METHOD FOR MANUFACTURING BONDED STRUCTURE, THERMAL TRANSFER SHEET, AND LAMINATE

(71) Applicant: NITTO DENKO CORPORATION, Ibaraki (JP)

(72) Inventors: Shigeki Ishiguro, Ibaraki (JP); Asuka Endo, Ibaraki (JP); Kayo Shimokawa, Ibaraki (JP); Yosuke Makihata, Ibaraki (JP); Ryohei Oban, Ibaraki (JP); Kenichi Okada, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 511 days.

(21) Appl. No.: 17/771,167

(22) PCT Filed: Oct. 19, 2020

(86) PCT No.: PCT/JP2020/039300
§ 371 (c)(1),
(2) Date: Apr. 22, 2022

(87) PCT Pub. No.: WO2021/079853
PCT Pub. Date: Apr. 29, 2021

(65) Prior Publication Data
US 2022/0371314 A1    Nov. 24, 2022

(30) Foreign Application Priority Data

Oct. 24, 2019  (JP) ................................. 2019-193740

(51) Int. Cl.
*B32B 37/26* (2006.01)
*B32B 7/12* (2006.01)
(Continued)

(52) U.S. Cl.
CPC ................ *B32B 37/26* (2013.01); *B32B 7/12* (2013.01); *B32B 27/12* (2013.01); *B32B 37/06* (2013.01);
(Continued)

(58) Field of Classification Search
CPC ........... B32B 37/26; B32B 7/12; B32B 27/12; B32B 37/06; B32B 37/12;
(Continued)

(56) References Cited

U.S. PATENT DOCUMENTS

2009/0195877 A1   8/2009  Nakai
2009/0311493 A1   12/2009  Manabe et al.
(Continued)

FOREIGN PATENT DOCUMENTS

CN    101426646 A    5/2009
CN    101497239 A    8/2009
(Continued)

OTHER PUBLICATIONS

Translation of JP-2010070581 (Year: 2010).*
(Continued)

*Primary Examiner* — Cynthia L Schaller
(74) *Attorney, Agent, or Firm* — Hauptman Ham, LLP

(57) ABSTRACT

The present invention relates to a method for manufacturing a laminate, including: a laminating step of laminating a side of a thermal transfer layer of a thermal transfer sheet having a release sheet and the thermal transfer layer on at least a part of a surface of a resin member by heat bonding, in which the release sheet has no yield points, and has an elongation at break of 100% to 600% in a stress-strain curve measured by a tensile test at a molding temperature Tβ° C. in the laminating step.

6 Claims, 4 Drawing Sheets

(51) Int. Cl.
 *B32B 27/12* (2006.01)
 *B32B 37/06* (2006.01)
 *B32B 37/12* (2006.01)

(52) U.S. Cl.
 CPC ........ *B32B 37/12* (2013.01); *B32B 2305/076* (2013.01); *B32B 2307/302* (2013.01); *B32B 2307/732* (2013.01)

(58) Field of Classification Search
 CPC ........ B32B 2305/076; B32B 2307/302; B32B 2307/732; B32B 27/00; B32B 27/06; B32B 33/00; B32B 37/10; B29C 43/52; B29C 43/206; B29C 43/183; B29C 2043/186; B29C 65/18
 See application file for complete search history.

(56) References Cited

U.S. PATENT DOCUMENTS

| | | |
|---|---|---|
| 2019/0030829 A1 | 1/2019 | Okada et al. |
| 2019/0152186 A1 | 5/2019 | Shimoda et al. |

FOREIGN PATENT DOCUMENTS

| | | | | |
|---|---|---|---|---|
| CN | 108834419 | A | | 11/2018 |
| JP | 2000-226536 | A | | 8/2000 |
| JP | 2007-136699 | A | | 6/2007 |
| JP | 2007-190689 | A | | 8/2007 |
| JP | 2008-88410 | A | | 4/2008 |
| JP | 2008-143104 | A | | 6/2008 |
| JP | 2010-5954 | A | | 1/2010 |
| JP | 2010-70581 | A | | 4/2010 |
| JP | 2010070581 | A | * | 4/2010 |
| JP | 2011-173298 | A | | 9/2011 |
| JP | 2011-194702 | A | | 10/2011 |
| JP | 2017-128722 | A | | 7/2017 |
| JP | 2017-177604 | A | | 10/2017 |
| JP | 2017-179149 | A | | 10/2017 |
| JP | 2017-179150 | A | | 10/2017 |
| JP | 2019-51687 | A | | 4/2019 |
| WO | 2007/123095 | A1 | | 11/2007 |
| WO | 2008/117842 | A1 | | 10/2008 |
| WO | WO-2017122797 | A1 | * | 7/2017 ............. B29C 65/02 |
| WO | 2017/179463 | A1 | | 10/2017 |

OTHER PUBLICATIONS

JP2010070581 Machine Translation of Description (Year: 2024).*
JP2017179149 Machine Translation of Description (Year: 2024).*
WO2017122797 Machine Translation of Description (Year: 2024).*
Office Action issued on Sep. 7, 2024 for corresponding Chinese Patent Application No. 202080073847.6, along with an English translation (22 pages).
Office Action issued on Jul. 9, 2024 for corresponding Japanese Patent Application No. 2020-175634, along with an English machine translation (15 pages).
Taiwanese Office Action issued on Mar. 8, 2024 for corresponding Taiwanese Patent Application No. 109136697, along with an English machine translation (16 pages).
Office Action issued on Mar. 16, 2024 for corresponding Chinese Patent Application No. 202080073847.6, along with an English machine translation (20 pages).
Office Action issued on Aug. 2, 2024 for corresponding Taiwanese Patent Application No. 109136697, along with an English translation (8 pages).
Office Action issued on Jan. 1, 2025 for corresponding Chinese Patent Application No. 202080073847.6, along with an English translation (22 pages).
Fan et al., "Engineering Plastics and Its Application" 2nd Edition, Jianfei Che Jan. 31, 2017, P84, along with a partial English translation (14 pages).
International Search Report issued on Dec. 22, 2020, for corresponding International Patent Application No. PCT/JP2020/039300, along with an English translation.
Written Opinion issued on Dec. 22, 2020, for corresponding International Patent Application No. PCT/JP2020/039300.

* cited by examiner

METHOD FOR MANUFACTURING LAMINATE, METHOD FOR MANUFACTURING COATED ARTICLE, METHOD FOR MANUFACTURING BONDED STRUCTURE, THERMAL TRANSFER SHEET, AND LAMINATE

CROSS REFERENCE TO RELATED APPLICATION

This application is a National Stage of International Application No. PCT/JP2020/039300, filed on Oct. 19, 2020, which designates the United States and was published in Japan, and which is based upon and claims priority to Japanese Patent Application No. 2019-193740, filed on Oct. 24, 2019 in the Japan Patent Office. All of the aforementioned applications are hereby incorporated by reference in their entireties.

TECHNICAL FIELD

The present invention relates to a method for manufacturing a laminate, a method for manufacturing a coated article, a method for manufacturing a bonded structure, a thermal transfer sheet, and a laminate.

BACKGROUND ART

In recent years, resin which is lightweight and excellent in impact resistance is used as a member, for example, a transport machine such as a railway vehicle, an aircraft, a ship, and an automobile, an electronic device, and a house facility, and an adherend made of various materials is bonded to a surface of the member. A coating film having various functions may be formed on the resin member.

When the resin member is bonded to an adherend such as a metal or another resin, a sufficient adhesive strength is required. When a coating film is applied to the resin member, various resins are used as a base polymer in the coating film, and the adhesion between the resin member and the coating film is required to be strengthened in order to prevent the coating film from peeling. The resin member has various shapes, and it is also required to cope with a complicated shape.

However, some types of the resin member and the adherend are difficult to conform to the adhesive, therefore a sufficient adhesive strength may not be obtained even when a related art adhesive or adhesive sheet is used. When the resin member is directly coated, some types of the resin member and the coating film have poor compatibility, a sufficient adhesive strength between the resin member and the coating film cannot be obtained, and problems such as unevenness and peeling of the coating film may occur.

As means for obtaining a sufficient adhesive strength, there are known various surface treatment methods such as a primer treatment (for example, Patent Literature 1) in which a primer solution is applied to a surface of a resin member after molding, and a sandblast treatment, a corona treatment, and a plasma treatment as a pretreatment.

As one of means for imparting a sufficient adhesive strength to the resin member, there is a technique using a surface modified sheet.

For example, Patent Literature 2 describes a surface modified sheet capable of imparting a sufficient adhesive strength by thermal transfer using heat by thermoforming of a resin member. Here, a transfer method in the form of a flat plate is described.

Patent Literature 3 describes an integral molding technique of transferring an adhesive layer to a resin substrate by in-mold injection molding. Here, a laminate including a substrate layer, an adhesive sheet layer, and a release sheet layer in this order is molded in advance using a mold having the same shape as that used in injection integral molding later to form a laminated molded body, and the laminated molded body is used in the injection integral molding later, whereby a resin at the time of injection molding is inserted without a gap, and a molded product that conforms to the shape of the mold can be obtained.

CITATION LIST

Patent Literature

Patent Literature 1: JP-A-2000-226536
Patent Literature 2: JP-A-2017-128722
Patent Literature 3: JP-A-2019-51687

SUMMARY OF INVENTION

Technical Problem

In the related-art surface treatment method described in Patent Literature 1, a surface treatment step and a drying step have to be provided, and there is a problem that the productivity is reduced.

Further, when a molding process of the resin member with a mold is performed, it is necessary to use a release agent, but since the surface of the resin member is contaminated by the release agent, a coating film having a sufficient strength cannot be formed on the surface of the resin member by the primer treatment. Therefore, a cleaning treatment step and a polishing treatment step for removing the release agent are required. As a result, there is a problem of cost increase such as equipment investment and running cost for performing these steps.

On the other hand, according to the film in-mold molding described in Patent Literatures 2 and 3, the surface treatment of the resin member can be performed without using a release agent during a molding process. However, there is a problem that depending on a molding temperature, wrinkles generated in a release sheet during the molding process, and the transference of the wrinkles to a surface of a thermal transfer layer lead to impair an appearance of an obtained laminate. In addition, attempts have been made to add a design layer by film in-mold molding, but there is a problem of followability of a release sheet or a design substrate to a three-dimensional shape of a mold. Further, a surface-treated resin member may be subjected to coating or bonding with an adherend, and therefore a high adhesive strength and high coating adhesion to an adherend are required.

In view of the above problems, an object of the present invention is to provide a method for manufacturing a laminate having good followability to a three-dimensional shape, and capable of preventing occurrence of wrinkles in a flat surface portion and a curved surface portion, of forming a laminate with an excellent appearance, of imparting high adhesiveness and coating adhesion, and of further integrally molding a thermal transfer layer and a resin member at the time of forming a laminate, and a method for manufacturing a coated article and a method for manufacturing a bonded structure using the laminate obtained by the method for manufacturing a laminate. Another object of the present invention is to provide a thermal transfer sheet suitable for the method for manufacturing a laminate and the like, and a laminate including the thermal transfer sheet.

Solution to Problem

The present inventors have intensively studied to solve the above problems. As a result, the present inventors have found that heat bonding of a thermal transfer sheet including a release sheet having no yield points and having tensile properties that an elongation at break is within a specific range to a resin member enable to exhibit a high adhesive strength and high coating adhesion, to achieve good followability to a three-dimensional shape, to prevent occurrence of wrinkles in a flat surface portion and a curved surface portion, to form a laminate excellent in appearance, and to integrally mold the thermal transfer layer and the resin member at the time of forming the laminate, and the present invention has been completed.

That is, the present invention relates to the following [1] to [16].

[1] A method for manufacturing a laminate, including:
a laminating step of laminating a side of a thermal transfer layer of a thermal transfer sheet having a release sheet and the thermal transfer layer on at least a part of a surface of a resin member by heat bonding, in which
the release sheet has no yield points, and has an elongation at break of 100% to 600% in a stress-strain curve measured by a tensile test at a molding temperature $T\beta°$ C. in the laminating step.

[2] The method for manufacturing a laminate according to [1], in which the release sheet has no yield points, and has an elongation at break of 150% to 600% in the stress-strain curve measured by the tensile test at the molding temperature $T\beta°$ C. in the laminating step.

[3] The method for manufacturing a laminate according to [1] or [2], in which the release sheet has an inclination of a plastic deformation region after 50% elongation from an inflection point of an elastic deformation region and the plastic deformation region of 0 to 50 in the stress-strain curve measured by the tensile test at the molding temperature $T\beta°$ C.

[4] The method for manufacturing a laminate according to any one of [1] to [3], in which the thermal transfer layer has an average thickness of 0.1 μm to 50 μm.

[5] The method for manufacturing a laminate according to any one of [1] to [4], in which in the laminating step, the heat bonding is performed by heat pressing.

[6] A method for manufacturing a coated article, including: a coating film forming step of peeling off the release sheet from a laminate obtained by the method for manufacturing a laminate according to any one of [1] to [5], and forming a coating film on the thermal transfer layer which is exposed.

[7] A method for manufacturing a bonded structure, including:
a bonding step of peeling off the release sheet from a laminate obtained by the method for manufacturing a laminate according to any one of [1] to [5], and bonding an adherend onto the thermal transfer layer which is exposed via an adhesive layer.

[8] A thermal transfer sheet, including:
a release sheet and a thermal transfer layer, in which the release sheet has no yield points, and has an elongation at break of 100% to 600% in a stress-strain curve measured by a tensile test at $T\alpha°$ C. represented by the following equation (1):

$T\alpha°$ C.=glass transition temperature of a release sheet $(Tg)°$ C.+70° C.     (1).

[9] The thermal transfer sheet according to [8], in which the release sheet has no yield points, and has an elongation at break of 150% to 600% in the stress-strain curve measured by the tensile test at $T\alpha°$ C. represented by the equation (1).

[10] The thermal transfer sheet according to [8] or [9], in which the release sheet has an inclination of a plastic deformation region after 50% elongation from an inflection point of an elastic deformation region and the plastic deformation region of 0 to 50 in the stress-strain curve measured by the tensile test at $T\alpha°$ C.

[11] The thermal transfer sheet according to any one of [8] to [10], in which the thermal transfer layer has an average thickness of 0.1 μm to 50 μm.

[12] The thermal transfer sheet according to any one of [8] to [11], in which the thermal transfer layer contains a polymer component, and the polymer component contains at least one type of a polymer having a non-polar unit and a polar unit, and a polymer obtained by modifying a part of a polymer constituted by the non-polar unit with the polar unit having a polar group.

[13] The thermal transfer sheet according to [12], in which the polymer component contains at least one type of a polymer selected from the group consisting of a methoxymethyl group-containing polymer, a hydroxy group-containing polymer, a carboxyl group-containing polymer, and an amino group-containing polymer.

[14] The thermal transfer sheet according to any one of [8] to [13], in which the thermal transfer sheet is used for heat bonding.

[15] A laminate, including:
the thermal transfer sheet according to any one of [8] to [14]; and
a resin member laminated on a side of the thermal transfer layer of the thermal transfer sheet.

[16] The laminate according to [15], in which the resin member is a prepreg.

Advantageous Effects of Invention

According to the method for manufacturing a laminate according to one aspect of the present invention, it is possible to achieve good followability to a three-dimensional shape, to prevent occurrence of wrinkles in a flat surface portion and a curved surface portion, to form a laminate excellent in appearance, to impart high adhesiveness and coating adhesion, and further to integrally mold the thermal transfer layer and the resin member at the time of forming the laminate.

The laminate according to one aspect of the present invention is excellent in adhesive strength to a coating film or an adherend, can prevent the occurrence of wrinkles, and can form a resin molded article having an excellent appearance.

According to the method for manufacturing a coated article and the method for manufacturing a bonded structure of one aspect of the present invention, a coated article and a bonded structure having an excellent strength and an excellent appearance can be obtained.

DESCRIPTION OF EMBODIMENTS

Figure 1:
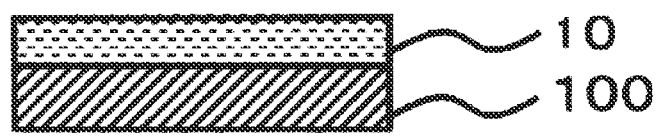
FIG. 1 is a schematic cross-sectional view showing an example of a laminate in which a thermal transfer layer is installed on a surface of a resin member.

Hereinafter, an embodiment of the present invention will be described in detail.
<Method for Manufacturing Laminate>
A method for manufacturing a laminate according to an embodiment of the present invention includes a laminating step of laminating a side of a thermal transfer layer of a thermal transfer sheet having a release sheet and the thermal transfer layer on at least a part of a surface of a resin member by heat bonding. Here, in the method for manufacturing a laminate, the release sheet has no yield points, and has an elongation at break of 100% to 600% in a stress-strain curve measured by a tensile test at a molding temperature Tβ° C. in the laminating step.
[Thermal Transfer Sheet]
A thermal transfer sheet used in a method for manufacturing a laminate according to an embodiment of the present invention includes a release sheet and a thermal transfer layer. Here, since the thermal transfer layer in the thermal transfer sheet is in the form of a sheet, the thermal transfer layer can be integrally molded not by being coated on a surface of a member but by being placed and heat-treated. Therefore, it is possible to prevent occurrence of unevenness due to occurrence of cissing or the like and to form the thermal transfer layer with a uniform thickness on the surface of the member. When the thermal transfer layer is formed on a part of the surface of the member, it is possible to prevent a decrease in yield due to protrusion or the like.
[Release Sheet]
In the method for manufacturing a laminate according to the embodiment of the present invention, the release sheet in the thermal transfer sheet has no yield points, and has an elongation at break of 100% to 600% in a stress-strain curve measured by a tensile test at a molding temperature Tβ° C. in the laminating step.

The tensile properties such as presence or absence of a yield point, an elongation at break, and an inclination of a plastic deformation region after 50% elongation from an inflection point of an elastic deformation region and the plastic deformation region to be described later, can be adjusted by a configuration of the release sheet, a material used, a combination thereof, and the like.
(Tensile Test)
Here, a tensile test is performed under the following test conditions using a tensile tester equipped with a constant temperature bath.

Test apparatus: AG-X 200N manufactured by Shimadzu Corporation
Sample piece: A punched piece of dumbbell No. 1 is used.
Tensile rate: 200 mm/min
Distance between gauge lines: 40 mm
Preheating: In the constant temperature bath set at Tβ° C., the sample piece is set between chucks, and after a door is closed and the temperature in the bath is stabilized (after about 10 minutes have elapsed), the test is started.
(Yield Point)
According to the tensile test at Tβ° C., when a stress-strain curve is taken with a horizontal axis as elongation (%) and a vertical axis as tensile stress (MPa), an inflection point usually appears at the time of transition of a sample from an elastic region to a plastic region.

At this time, a phenomenon in which a local maximum point appears in the stress-strain curve, a stress once decreases, and then the stress increases again is referred to as a necking phenomenon, and the local maximum point on the stress-strain curve is referred to as a yield point.

Here, when the release sheet has no yield points in the stress-strain curve measured by the tensile test at the molding temperature Tβ° C., local elongation of the release sheet at the time of molding is prevented, and thus no bending or tears occurs not only in a flat surface portion but also in a curved surface portion that is easily stretched locally, and curved surface followability is improved. Therefore, occurrence of wrinkles is satisfactorily prevented not only in the flat surface portion but also in the curved surface portion.
(Elongation at Break)
In the stress-strain curve measured by the tensile test at Tβ° C., a point at which the release sheet is cut is defined as a breaking point, and an elongation value at that time is defined as an elongation at break.

Here, when the elongation at break is 100% to 600%, uniform elongation can be obtained, and thus it is possible to follow a three-dimensional shape. When the elongation at break is less than 100%, the elongation is insufficient, and thus wrinkles may be generated or the sheet may be broken. When the elongation at break is greater than 600%, a sufficient thickness of the thermal transfer layer may not be obtained after molding. The elongation at break is preferably 110% to 500%, more preferably 120% to 400%, and still more preferably 150% to 400%. In one aspect, the elongation at break may be 150% to 600%.

In the stress-strain curve measured by the tensile test at Tβ° C., an inclination of the plastic deformation region after 50% elongation from an inflection point of the elastic deformation region and the plastic deformation region of the release sheet is preferably 0 to 50.

When the inclination is 0 to 50, uniform elongation can be obtained in a wider range, and good three-dimensional followability can be obtained. Thus, the inclination is preferably 0 to 50. When the inclination is less than 0, local elongation may occur. When the inclination is greater than 50, sufficient elongation cannot be obtained, and wrinkles may be generated at the time of molding. The inclination is more preferably 5 to 40, and still more preferably 10 to 30.

Here, since an inflection point is present at the time of transition from the elastic region to the plastic region, an inclination "a" can be obtained by the following equation (i) with a starting point being a point 50% after the inflection point.

$$a=((S2-S1)/(E2-E1))\times 100 \qquad (i)$$

E1: (Elongation at inflection point+50) (%)
E2: ((Elongation at inflection point+50)+30) (%)

S1: Stress (MPa) at (elongation at inflection point+50) (%)

S2: Stress (MPa) at ((elongation at inflection point+50)+30) (%)

Examples of the release sheet that can be used in the thermal transfer sheet include unstretched polyamide 6, unstretched polyamide 66, biaxially stretched polyamide 6, biaxially stretched polyamide 66, biaxially stretched polypropylene, biaxially stretched polyethylene terephthalate, biaxially stretched polybutylene terephthalate, easily molded polyethylene terephthalate, cast molded polytetrafluoroethylene, an unstretched extrusion-molded tetrafluoroethylene-ethylene copolymer (ETFE), an unstretched extrusion-molded tetrafluoroethylene-perfluoroalkoxyethylene copolymer (PFA), an unstretched extrusion-molded tetrafluoroethylene-hexafluoropropylene copolymer (FEP), and a laminated product having these as a main layer.

A thickness of the release sheet is preferably 5 μm or more, more preferably 10 μm or more, still more preferably 20 μm or more, and even more preferably 30 μm or more, from the viewpoint of handleability and prevention of breakage. In addition, the thickness is preferably 200 μm or less, more preferably 150 μm or less, and still more preferably 100 μm or less, from the viewpoint of followability to a three-dimensional shape.

As necessary, a release treatment with an appropriate release treatment agent such as silicone may be performed on a surface of the side of the thermal transfer layer of the release sheet or on both surfaces of the release sheet.

[Thermal Transfer Layer]

The thermal transfer layer (which may be a material of the thermal transfer layer) preferably contains a polymer component, and the polymer component preferably contains at least one type of a polymer having a non-polar unit and a polar unit having a polar group, and a polymer obtained by modifying a part of a polymer constituted by a non-polar unit with a polar unit having a polar group. A content ratio of the polymer component in the thermal transfer layer is preferably 50 mass % to 100 mass %, more preferably 70 mass % to 100 mass %, still more preferably 90 mass % to 100 mass %, particularly preferably 92 mass % to 100 mass %, and most preferably 95 mass % to 100 mass %.

Examples of the non-polar unit in the polymer component include an aliphatic hydrocarbon unit, an aromatic hydrocarbon unit, and an alicyclic hydrocarbon unit. The number of carbon atoms of the non-polar unit is preferably 2 to 40, more preferably 3 to 30, and still more preferably 4 to 20. The non-polar units may be used alone or in combination of two or more of these.

Examples of the polar unit having a polar group in the polymer component include an epoxy group, a carboxyl group, a nitrile group, an amide group, an ester group, a hydroxy group, an acid anhydride, and a silanol group. Examples of the polar unit having such a polar group include a glycidyl methacrylate unit, a vinyl acetate unit, an acrylonitrile unit, an amide unit, a (meth) acrylic acid ester unit, a hydroxyethyl (meth) acrylate unit, and a maleic anhydride unit. The polar units may be used alone or in combination of two or more of these.

The polymer component that may be contained in the thermal transfer layer (which may be a material of the thermal transfer layer) may be at least one selected from the group consisting of a methoxymethyl group-containing polymer, a hydroxy group-containing polymer, a carboxyl group-containing polymer, and an amino group-containing polymer.

Such a polymer component that may be contained in the thermal transfer layer (which may be a material of the thermal transfer layer) is preferably an addition type curing agent, and more preferably an addition type curing agent that is allowed to react with an epoxy group.

Examples of the methoxymethyl group-containing polymer include a methoxymethylated polyamide resin.

As the methoxymethyl group-containing polymer, a commercially available product may be used. Examples of such commercially available products include "Fine Resin" (registered trademark) FR-101, FR-104, FR-105, EM-120, and EM-220 series (manufactured by Namariichi Co., Ltd.).

The methoxymethyl group-containing polymer may be used alone or in combination of two or more of these.

The methoxymethyl group-containing polymer has a weight average molecular weight (Mw) of preferably 1,000 to 1,000,000, more preferably 3,000 to 500,000, still more preferably 5,000 to 100,000, particularly preferably 7,000 to 70,000, and most preferably 10,000 to 50,000, from the view of being able to further exhibit the effects of the present invention. A method for measuring the weight average molecular weight (Mw) will be described later.

Examples of the hydroxy group-containing polymer include a hydroxy group-containing acrylic polymer.

As the hydroxy group-containing polymer, a commercially available product may be used. Examples of such commercially available products include "ARUFON (registered trademark) UH-2000 series" (manufactured by Toagosei Co., Ltd.).

The hydroxy group-containing polymers may be used alone or in combination of two or more of these.

The hydroxy group-containing polymer has a weight average molecular weight (Mw) of preferably 500 to 1,000,000, more preferably 700 to 500,000, still more preferably 1,000 to 100,000, particularly preferably 1,500 to 70,000, and most preferably 2,000 to 50,000, from the view of being able to further exhibit the effects of the present invention. The method for measuring the weight average molecular weight (Mw) will be described later.

Examples of the carboxyl group-containing polymer include a carboxyl group-containing acrylic polymer and a carboxyl group-containing acrylic oligomer.

As the carboxyl group-containing polymer, a commercially available product may be used. Examples of such commercially available products include "ARUFON (registered trademark) UC-3000, UC3510, and UC3080 series" (manufactured by Toagosei Co., Ltd.).

The carboxyl group-containing polymer may be used alone or in combination of two or more of these.

The carboxyl group-containing polymer has a weight average molecular weight (Mw) of preferably 500 to 1,000,000, more preferably 700 to 500,000, still more preferably 1,000 to 100,000, particularly preferably 1,500 to 70,000, and most preferably 2,000 to 50,000, from the view of being able to further exhibit the effects of the present invention. As the weight average molecular weight (Mw), a polystyrene equivalent molecular weight in the GPC measurement was used.

As the amino group-containing polymer, any suitable polymer can be adopted as long as the polymer contains an amino group ($-NH_2$) and the effects of the present invention are not impaired.

As the amino group-containing polymer, a commercially available product may be used.

The amino group-containing polymers may be used alone or in combination of two or more of these.

The thermal transfer layer (which may be the material of the thermal transfer layer) may contain at least one type selected from the group consisting of a tertiary amine-containing compound and a strong acid.

The tertiary amine-containing compound or the strong acid that may be contained in the thermal transfer layer (which may be the material of the thermal transfer layer) is preferably a catalyst type curing agent, more preferably a catalyst type curing agent which is allowed to react with an epoxy group.

Examples of the tertiary amine-containing compound include imidazole derivatives and polyethyleneimine.

As the tertiary amine-containing compound, a commercially available product may be used. Examples of such commercially available products include "CUREZOL" series (imidazole-based epoxy resin curing agent, manufactured by Shikoku Chemical Co., Ltd.) as imidazole derivatives, and "EPOMIN" (registered trademark) series (manufactured by Nippon Shokubai Co., Ltd.) as polyethyleneimine.

The tertiary amine-containing compounds may be used alone or in combination of two or more of these.

Examples of the strong acid include trifluoroborane, an ionic liquid, and Nafion.

Examples of the ionic liquid include $BF_3$—$C_2H_5NH_2$ and $HMI$—$PF_6$.

As the strong acid, a commercially available product may be used.

The strong acid may be used alone or in combination of two or more of these.

In the embodiment of the present invention, the thermal transfer layer preferably has an average thickness of 0.1 μm to 50 μm.

When there is a pinhole on the surface of the member, the appearance of the resin member obtained by the subsequent coating or the like is impaired. In the embodiment of the present invention, since the average thickness of the thermal transfer layer is 0.1 μm to 50 μm, unevenness such as pinholes on the surface of the member can be filled, and a more excellent appearance can be obtained. Thus, the thickness of the thermal transfer layer is preferably 0.1 μm to 50 μm.

When the thickness of the thermal transfer layer is 0.1 μm to 50 μm, the thermal transfer layer appropriately flows during thermoforming. Therefore, sliding property can be imparted to the release sheet, and followability to a mold shape is improved. Thus, the thickness of the thermal transfer layer is preferably 0.1 μm to 50 μm.

The average thickness of the thermal transfer layer is more preferably 0.5 μm or more, and still more preferably 0.7 μm or more, from the viewpoint of filling unevenness such as pinholes on the surface of the member and obtaining a more excellent appearance. The average thickness of the thermal transfer layer is more preferably 40 μm or less, still more preferably 20 μm or less, from the viewpoint of an adhesive strength.

As the thickness of the thermal transfer layer, the difference between the thickness of the thermal transfer sheet measured by a dial thickness gauge (for example, PEACOCK GC-9) and the thickness of the release sheet from which the thermal transfer layer at that location has been removed can be measured.

The average thickness of the thermal transfer layer is an average value obtained by measuring 10 points.

(Laminating Step)

In the method for manufacturing a laminate according to the embodiment of the present invention, the laminate can be manufactured by laminating the side of the thermal transfer layer of the thermal transfer sheet on at least a part of the surface of the resin member and performing heat bonding.

The heat bonding may be performed simultaneously with the lamination of the thermal transfer sheet, or may be performed after the thermal transfer sheet is laminated.

By performing the surface treatment of the resin member by such a method, a sufficient adhesive strength can be imparted to the resin member, and the laminate can be manufactured with high productivity and low cost. The method for manufacturing the laminate may be a method for treating the surface of the resin member (a method for treating the surface of the resin).

The resin contained in the resin member may be a thermoplastic resin or a thermosetting resin.

Examples of the thermoplastic resin include PP (polypropylene), PA (polyamide), PPE (polyphenylene ether), PPS (polyphenylene sulfide), PET (polyethylene terephthalate), PBT (polybutylene terephthalate), POM (polyacetal), PEEK (polyether ether ketone), PC (polycarbonate), PES (polyether sulfide), and EP (epoxy). Among these resins, examples of the thermoplastic resin that can advantageously exhibit the effects of the present invention include PPS (polyphenylene sulfide), PA (polyamide), PES (polyether sulfide), and EP (epoxy).

As the thermoplastic resin, a fiber reinforced thermoplastic resin (FRTP) may be adopted.

Examples of the fiber reinforced thermoplastic resin (FRTP) include a carbon fiber reinforced thermoplastic resin (CFRTP) and a glass fiber reinforced thermoplastic resin (GFRTP).

Examples of the carbon fiber reinforced thermoplastic resin (CFRTP) include a PPS-based carbon fiber reinforced thermoplastic resin, a PA-based carbon fiber reinforced thermoplastic resin, a PES-based carbon fiber reinforced thermoplastic resin, an EP-based carbon fiber reinforced thermoplastic resin, and a PP-based carbon fiber reinforced thermoplastic resin.

Examples of the glass fiber reinforced thermoplastic resin (GFRTP) include a PPS-based glass fiber reinforced thermoplastic resin, a PA-based glass fiber reinforced thermoplastic resin, and a PP-based glass fiber reinforced thermoplastic resin.

Examples of the thermosetting resin include an unsaturated polyester resin, a vinyl ester resin, an epoxy resin, a melamine resin, a phenol resin, a urethane resin, a polyisocyanate resin, a polyisocyanurate resin, and a polyimide resin.

Examples of a shape of the resin member include a plate shape having a flat surface, a plate shape having a curved surface, a sheet shape, and a film shape.

A thickness of the resin member is, for example, 0.001 mm to 10 mm.

The resin member may be a prepreg. A prepreg is obtained by impregnating a reinforcing material such as carbon fiber or glass fiber with a thermosetting resin in which an additive such as a curing agent is mixed, and heating or drying the mixture to be in a semi-cured state.

The "at least a part of the surface of the resin member" means at least a part of all the surfaces of the resin member. For example, in a case where the resin member has a plate shape, a sheet shape, or a film shape, the "at least a part of the surface of the resin member" means a part of at least one of the surfaces of the resin member, or the whole surface of at least one of the surfaces of the resin member.

In a case of using a thermoplastic resin as the resin in the resin member, in the manufacture of the laminate, when a melting point of the thermoplastic resin is $T_1°$ C., it is preferable that a thermal transfer layer is installed on at least a part of a surface of the thermoplastic resin member, and heat bonding is performed at a temperature of $(T_1-50)°$ C. or higher. The temperature of the heat bonding is preferably $(T_1-50)°$ C. to $(T_1+150)°$ C., more preferably $(T_1-25)°$ C. to $(T_1+100)°$ C., still more preferably $(T_1-10)°$ C. to $(T_1+75)°$ C., and particularly preferably $(T_1)°$ C. to $(T_1+50)°$ C. By setting the heat bonding temperature, that is, the molding temperature $T\beta°$ C. in the above range and performing the surface treatment of the resin member by the method as described above, an interface between the thermal transfer layer and the thermoplastic resin member is melt-contacted and weld-mixed, and a sufficient adhesive strength can be imparted to the thermoplastic resin member. Such imparting can be performed with high productivity and low cost.

In the case of using the thermoplastic resin as the resin in the resin member, after at least a part of the surface of the thermoplastic resin member is brought into a molten state, a thermal transfer layer is possible to be installed on the surface of the thermoplastic resin member in the molten state. By installing the thermal transfer layer on the surface of the thermoplastic resin member in the molten state, the thermal transfer layer is welded and mixed by the heat of the surface of the thermoplastic resin member, and the sufficient adhesive strength can be imparted to the thermoplastic resin member.

In a case of using a thermosetting resin as the resin in the resin member, in the manufacture of the laminate, when a curing temperature of the thermosetting resin is $T_2°$ C., it is preferable that a thermal transfer layer is installed on at least a part of the surface of the thermosetting resin member, and heat bonding is performed at a temperature of $(T_2-50)°$ C. or higher. The curing temperature is a peak temperature of an exothermic curve measured by DSC. The temperature of the heat bonding is preferably $(T_2-50)°$ C. to $(T_2+50)°$ C., more preferably $(T_2-40)°$ C. to $(T_2+40)°$ C., still more preferably $(T_2-30)°$ C. to $(T_2+30)°$ C., and particularly preferably $(T_2-20)°$ C. to $(T_2+20)°$ C. By setting the heat bonding temperature, that is, the molding temperature $T\beta°$ C. in the above range and performing the surface treatment of the resin member by the method as described above, chemical bonds at an interface between the thermal transfer layer and the thermosetting resin member enable to impart a sufficient adhesive strength to the thermosetting resin member. Such imparting can be performed with high productivity and low cost.

In a case where the resin member is a prepreg, a mixed layer in which the prepreg and the thermal transfer layer are mixed is preferably installed between the prepreg and the thermal transfer layer.

In a case where the resin contained in the resin member is a thermosetting resin, after softening at least a part of the surface of the thermosetting resin member by heating, a thermal transfer layer can be installed on the surface of the thermosetting resin member. By installing the thermal transfer layer on the surface of the thermosetting resin member softened by heating, the thermal transfer layer is chemically bonded by the heat of the surface of the thermosetting resin member, and a sufficient adhesive strength can be imparted to the thermosetting resin member.

The term "chemical bonds" can be made by chemically covalent bonding between the materials of the resin member and the thermal transfer layer.

Examples of a method of heat bonding include oven heating, infrared heating, high-frequency heating, and heat pressing, and heat pressing (press molding) is preferred.

A heat bonding time is preferably 1 second to 10 minutes.

In the laminating step, the resin member may be laminated on the side of the thermal transfer layer of the thermal transfer sheet and then molded by heat pressing.

As the heat pressing, an aspect that in a molding machine (for example, a press machine), the side of the thermal transfer layer of the thermal transfer sheet is laminated on at least a part of the surface of the resin member, and a molding process with heating (for example, integral molding by heat pressing) is performed is exemplified. According to this aspect, since the surface treatment of the resin member and the molding process of the resin member can be performed at the same time, high productivity and low cost can be provided.

Further, by peeling off the release sheet from the laminate, a laminate including the thermal transfer layer on the surface of the laminate is obtained. The peeling of the release sheet is not particularly limited, such as peeling by hand or using a dedicated peeling facility.

After the side of the thermal transfer layer of the thermal transfer sheet which is a laminate of the release sheet and the thermal transfer layer is placed on at least a part of the surface of the resin member and heat-bonded, the release sheet is preferably removed. By removing the release sheet in this manner, the thermal transfer layer is transferred to the surface of the resin member, and a laminate (also referred to as a laminate member of the resin member and the thermal transfer layer) is obtained.

As described above, a mixed layer in which the resin member and the thermal transfer layer are mixed is preferably installed between the resin member and the thermal transfer layer.

By the above manufacturing method, as shown in FIG. 1, a thermal transfer layer 10 is installed on a surface of a resin member 100, and a laminate is obtained. In FIG. 1, the thermal transfer layer 10 is laminated on the surface of the resin member 100, but a mixed layer (not shown) in which the resin member and the thermal transfer layer are mixed is preferably installed between the resin member 100 and the thermal transfer layer 10.

Figure 2:
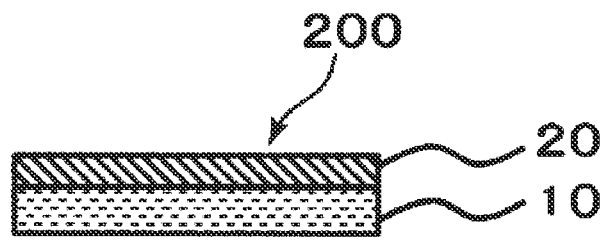
FIG. 2 is a schematic cross-sectional view showing an example of a thermal transfer sheet.

As shown in FIG. 2, the thermal transfer sheet which is the laminate of the release sheet and the thermal transfer layer is a thermal transfer sheet 200 which is a laminate of a release sheet 20 and the thermal transfer layer 10.

Figure 3:
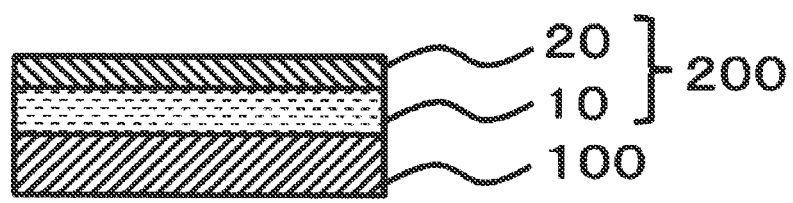
FIG. 3 is a schematic cross-sectional view showing a form in which a side of the thermal transfer layer of the thermal transfer sheet which is a laminate of a release sheet and the thermal transfer layer is placed on at least a part of the surface of the resin member.

In the method for manufacturing a laminate according to the embodiment of the present invention, the form in which the side of the thermal transfer layer of the thermal transfer sheet, which is the laminate of the release sheet and the thermal transfer layer, is placed on at least a part of the surface of the resin member is a form in which the thermal transfer sheet 200 is placed on the surface of the resin member 100 such that a side of the thermal transfer layer 10 of the thermal transfer sheet 200 is on a surface side of the resin member 100, as shown in FIG. 3.

<Method for Manufacturing Coated Article>

A method for manufacturing a coated article according to an embodiment of the present invention includes a coating film forming step of peeling off a release sheet of a laminate obtained by the above method for manufacturing a laminate, and forming a coating film on a thermal transfer layer which is exposed.

By the coating film forming step, a coated article including a coating film on at least a part of a surface on a side of the thermal transfer layer of the laminate can be obtained.

Figure 4:
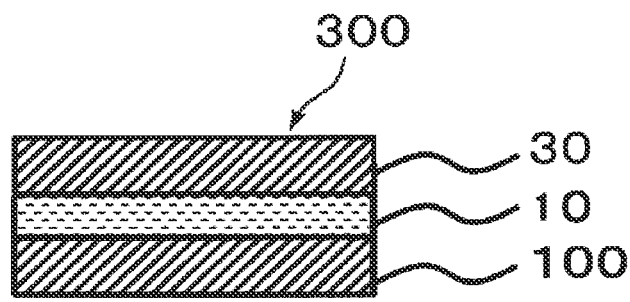
FIG. 4 is a schematic cross-sectional view showing an example of a coated article.

As an example of the coated article, in FIG. 4, a coated article 300 including a coating film 30 on the surface of the side of the thermal transfer layer of the laminate in which the thermal transfer layer 10 is installed on the surface of the resin member 100 is shown.

Since the thermal transfer layer is formed not by being coated on the surface of the resin member but using a sheet-shaped thermal transfer sheet, it is possible to prevent the occurrence of unevenness due to the occurrence of cissing or the like. Therefore, the thermal transfer layer can be formed with a uniform thickness on the surface of the resin member, and the coating film can be coated with a uniform thickness. By installing the thermal transfer layer on the surface of the resin member in the molten state, the thermal transfer layer is melted and mixed by the heat of the surface of the resin member, and an adhesive strength between the thermal transfer layer and the resin member is high, and thus a coating film having excellent adhesion can be formed. Further, since the thermal transfer layer and the resin member can be integrally molded at the time of forming the coated article, there is no need for a cleaning treatment step or a polishing treatment step using an organic solvent for removing a release agent before the formation of the coating film, as a result, an environmental load and a work load can be reduced with excellent safety.

The coating film is not particularly limited, and examples thereof include coating, a printed layer, a vapor deposition layer, and a plating layer. A material for forming the coating film is not particularly limited, and examples thereof include compositions containing various polymers such as acrylic-based, urethane-based, epoxy-based, fluorine-based, polyester melamine-based, alkyd melamine-based, acrylic melamine-based, acrylic urethane-based, and acrylic acid curing agent-based.

A thickness of the coating film is not particularly limited, and is preferably 0.01 μm to 2,000 μm, more preferably 0.1 μm to 1,000 μm, still more preferably 0.5 μm to 500 μm, and particularly preferably 1 μm to 200 μm.

A coating method of the coating film is not particularly limited, and general methods such as brush coating, roller coating, spray coating, and various coater coating may be used, and a coating amount of these is not particularly limited. A time, a temperature, and the like for heating the coating film can also be appropriately determined depending on a coating material, a coating amount, and the like used.

<Method for Manufacturing Bonded Structure>

A method for manufacturing a bonded structure according to an embodiment of the present invention includes a bonding step of peeling off a release sheet from a laminate obtained by a method for manufacturing a laminate, and bonding an adherend onto a thermal transfer layer which is exposed via an adhesive layer.

By the bonding step, a bonded structure in which the adherend is bonded to at least a part of a surface on a side of the thermal transfer layer of the laminate via the adhesive layer can be obtained.

Figure 5:
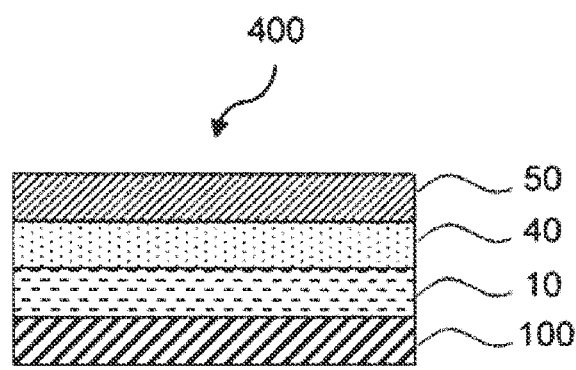
FIG. 5 is a schematic cross-sectional view showing an example of a bonded structure.

As an example of the bonded structure, in FIG. 5, a bonded structure 500, in which an adherend 50 is bonded, via an adhesive layer 40, to the surface of the side of the thermal transfer layer 10 of the laminate, in which the thermal transfer layer 10 is installed on the surface of the resin member 100, is shown.

Since the thermal transfer layer is formed not by being coated on the surface of the resin member but using a sheet-shaped thermal transfer sheet, it is possible to prevent the occurrence of unevenness due to the occurrence of cissing or the like. Therefore, the thermal transfer layer can be formed with a uniform thickness on the surface of the resin member, and the adhesive layer can be coated with a uniform thickness. By installing the thermal transfer layer on the surface of the resin member in the molten state, the thermal transfer layer is melted and mixed by the heat of the surface of the resin member, and the adhesive strength between the thermal transfer layer and the resin member is high, and thus an adhesive layer having excellent adhesion can be formed. Further, since the thermal transfer layer and the resin member can be integrally molded at the time of forming the bonded structure, there is no need for a cleaning treatment step or a polishing treatment step using an organic solvent for removing a release agent before the formation of the adhesive layer, as a result, an environmental load and a work load can be reduced with excellent safety.

An adhesive contained in the adhesive layer is not particularly limited, and suitable adhesives such as acrylic-based, silicone-based, epoxy-based, phenol-based, polyurethane-based, cyanoacrylate-based, and polyamide-based can be used.

Examples of the adherend constituting the bonded structure can include a thermosetting resin and a thermoplastic resin used for the above resin member, a resin-based member made of FRP in which carbon fiber or glass fiber is impregnated with these resins, a metal-based member made of iron, aluminum, titanium, copper, or an alloy mainly made of these, an inorganic member such as glass, tile, and concrete, and a wood-based member such as wood. However, examples of the adherend constituting the bonded structure are not limited to these.

<Thermal Transfer Sheet>

A thermal transfer sheet according to one aspect of the present invention includes a release sheet and a thermal transfer layer, and the release sheet has no yield points, and has an elongation at break of 100% to 600% in a stress-strain curve measured by a tensile test at $T\alpha°$ C. represented by the following equation (1):

$$T\alpha° \text{ C.} = \text{glass transition temperature of a release sheet } (Tg)° \text{ C.} + 70° \text{ C.} \qquad (1).$$

In the thermal transfer sheet according to this aspect, since the thermal transfer layer has a sheet shape, the thermal transfer sheet can be integrally molded not by being coated on the surface of the member but being placed and heat-treated. Therefore, it is possible to prevent the occurrence of unevenness due to the occurrence of cissing or the like and to form the thermal transfer layer with a uniform thickness on the surface of the member. When the thermal transfer layer is formed on a part of the surface of the member, it is possible to prevent a decrease in yield due to protrusion or the like.

[Thermal Transfer Layer]

As the thermal transfer layer in the thermal transfer sheet of the present aspect, the description of the thermal transfer layer in the thermal transfer sheet used in the above method for manufacturing a laminate may be used as it is.

[Release Sheet]

The release sheet in the thermal transfer sheet of the present aspect has no yield points, and has an elongation at break of 100% to 600% in a stress-strain curve measured by a tensile test at $T\alpha°$ C. represented by the following equation (1):

$$T\alpha° \text{ C.} = \text{glass transition temperature of a release sheet } (Tg)° \text{ C.} + 70° \text{ C.} \qquad (1).$$

(Tensile Test)

Here, a tensile test is performed under the following test conditions using a tensile tester equipped with a constant temperature bath.

Test apparatus: AG-X 200N manufactured by Shimadzu Corporation
Sample piece: A punched piece of dumbbell No. 1 is used.
Tensile rate: 200 mm/min
Distance between gauge lines: 40 mm
Preheating: In the constant temperature bath set at Tα° C., the sample piece is set between chucks, and after a door is closed and the temperature in the bath is stabilized (after about 10 minutes have elapsed), the test is started.
(Yield Point)

According to the tensile test at Tα° C., when a stress-strain curve is taken with a horizontal axis as elongation (%) and a vertical axis as tensile stress (MPa), an inflection point usually appears at the time of transition of a sample from an elastic region to a plastic region.

At this time, a phenomenon in which a local maximum point appears in the stress-strain curve, a stress once decreases, and then the stress increases again is referred to as a necking phenomenon, and the local maximum point on the stress-strain curve is referred to as a yield point.

Here, when the release sheet has no yield points in the stress-strain curve measured by the tensile test at Tα° C., local elongation of the release sheet at the time of molding is prevented, and thus no bending or tears occurs not only in a flat surface portion but also in a curved surface portion that is easily stretched locally, and curved surface followability is improved. Therefore, occurrence of wrinkles is satisfactorily prevented not only in the flat surface portion but also in the curved surface portion.

(Elongation at Break) In the stress-strain curve measured by the tensile test at Tα° C., a point at which the release sheet is cut is defined as breaking point, and an elongation value at that time is defined as an elongation at break.

Here, when the elongation at break is 100% to 600%, uniform elongation can be obtained, and thus it is possible to follow a three-dimensional shape. When the elongation at break is less than 100%, the elongation is insufficient, and thus wrinkles may be generated or the sheet may be broken. When the elongation at break is greater than 600%, a sufficient thickness of the thermal transfer layer may not be obtained after molding. The elongation at break is preferably 110% to 500%, more preferably 120% to 400%, and still more preferably 150% to 400%. In one aspect, the elongation at break may be 150% to 600%.

In the stress-strain curve measured by the tensile test at Tα° C., an inclination of the plastic deformation region after 50% elongation from an inflection point of the elastic deformation region and the plastic deformation region of the release sheet is preferably 0 to 50.

When the inclination is 0 to 50, uniform elongation can be obtained in a wider range, and good three-dimensional followability can be obtained. Thus, the inclination is preferably 0 to 50. When the inclination is less than 0, local elongation may occur. When the inclination is greater than 50, sufficient elongation cannot be obtained, and wrinkles may be generated at the time of molding. The inclination is more preferably 5 to 40, and still more preferably 10 to 30.

Here, since an inflection point is present at the time of transition from the elastic region to the plastic region, an inclination "a" can be obtained by the following equation (i) with a starting point being a point 50% after the inflection point.

$$a = ((S2-S1)/(E2-E1)) \times 100 \quad (i)$$

E1: (Elongation at inflection point+50) (%)
E2: ((Elongation at inflection point+50)+30) (%)
S1: Stress (MPa) at (elongation at inflection point+50) (%)
S2: Stress (MPa) at ((elongation at inflection point+50)+30) (%)

As for the glass transition temperature of a release sheet (Tg), a storage elastic modulus and a loss elastic modulus are measured, a value of tan δ (E" (loss elastic modulus)/E' (storage elastic modulus)) is calculated, and a peak temperature of tan δ on a low temperature side is taken as the glass transition temperature (Tg).

Examples of the release sheet that can be used in the thermal transfer sheet include unstretched polyamide 6, unstretched polyamide 66, biaxially stretched polyamide 6, biaxially stretched polyamide 66, biaxially stretched polypropylene, biaxially stretched polyethylene terephthalate, biaxially stretched polybutylene terephthalate, easily molded polyethylene terephthalate, cast molded polytetrafluoroethylene, an unstretched extrusion-molded tetrafluoroethylene-ethylene copolymer (ETFE), an unstretched extrusion-molded tetrafluoroethylene-perfluoroalkoxyethylene copolymer (PFA), an unstretched extrusion-molded tetrafluoroethylene-hexafluoropropylene copolymer (FEP), and a laminated product having these as a main layer.

The thickness of the release sheet is preferably 5 μm or more, more preferably 10 μm or more, still more preferably 20 μm or more, and even more preferably 30 μm or more, from the viewpoint of handleability and prevention of breakage. In addition, the thickness is preferably 200 μm or less, more preferably 150 μm or less, and still more preferably 100 μm or less, from the viewpoint of followability to a three-dimensional shape.

As necessary, a release treatment with an appropriate release treatment agent such as silicone may be performed on a surface of the side of the thermal transfer layer of the release sheet or on both surfaces of the release sheet.

A thermal transfer sheet according to another aspect includes a release sheet and a thermal transfer layer, and the release sheet has no yield points, and has an elongation at break of 100% to 600% in a stress-strain curve measured by a tensile test at a molding temperature Tβ° C. in the laminating step.

[Manufacture of Thermal Transfer Sheet]

The thermal transfer sheet can be manufactured by any appropriate method. Examples of the method include a method of dipping the release sheet into a solution (a composition for forming a thermal transfer layer) containing a material of the thermal transfer layer and a solvent and then drying the release sheet which was dipped into the solution as necessary, a method of brush coating of the solution containing the material of the thermal transfer layer and the solvent to the surface of the release sheet and then drying the release sheet to which the solution was brush coated as necessary, a method of coating of the solution containing the material of the thermal transfer layer and the solvent to the surface of the release sheet by various coaters and then drying the release sheet to which the solution was coated as necessary, and a method of spray coating of the solution containing the material of the thermal transfer layer and the solvent to the surface of the release sheet and then drying the release sheet to which the solution was spray coated as necessary.

Examples of the composition for forming the thermal transfer layer include a solution in which a material of the thermal transfer layer is dissolved in a solvent.

Examples of the solvent include water, alcohols such as methanol, ethanol, and isopropyl alcohol; ketones such as methyl ethyl ketone; ester; aliphatic, alicyclic, and aromatic hydrocarbons; halogenated hydrocarbons; amides such as dimethylformamide; sulfoxides such as dimethyl sulfoxide; and ethers such as dimethyl ether and tetrahydrofuran. Ethanol or a mixed solvent of ethanol and water is preferred in order to prevent generation of gelatinized materials. These solvents may be used alone or in combination of two or more of these.

A solid content concentration in the composition for forming the thermal transfer layer may be appropriately set depending on purposes. From the viewpoint of the thickness accuracy of the thermal transfer layer, a mass ratio is preferably 0.01 mass % to 20 mass %, more preferably 0.05 mass % to 10 mass %, and still more preferably 0.1 mass % to 5 mass %.

The composition for forming the thermal transfer layer may contain various additives such as a pH adjusting agent, a crosslinking agent, a viscosity adjusting agent (such as a thickener), a leveling agent, a peeling adjusting agent, a plasticizer, a softening agent, a filler, a coloring agent (such as a pigment or a dye), a surfactant, an antistatic agent, a preservative, an antiaging agent, an ultraviolet absorber, an antioxidant, and a light stabilizer, as necessary.

For example, by adding a coloring agent, the thermal transfer layer is visualized, and it is easy to determine whether or not the surface of the resin member has already been modified, and there is an advantage in terms of the process management.

Examples of the coloring agent include a dye and a pigment. A fluorescent material that can be visually recognized by a black light may be used.

[Laminate]

A laminate according to an embodiment of the present invention includes the thermal transfer sheet and a resin member laminated on a side of the thermal transfer layer of the thermal transfer sheet. The laminate preferably includes a mixed layer in which a resin and a thermal transfer layer are mixed between the resin member and the thermal transfer layer.

As the thermal transfer sheet, the thermal transfer layer, and the resin member, the above description may be used as it is.

The mixed layer is a layer in which a resin and a thermal transfer layer are mixed. For example, by installing a thermal transfer layer on at least a part of the surface of the resin member and performing heat welding or heat bonding, an interface between the thermal transfer layer and the resin member is melt-contacted and weld-mixed, thereby obtaining a layer of the weld-mixed portion as the mixed layer. The formation of the mixed layer improves an adhesive strength between the resin member and the thermal transfer layer. In the mixed layer, the resin and the thermal transfer layer are preferably bonded by a chemical reaction such as covalent bonding. By the chemical reaction such as covalent bonding, the interface between the resin member and the thermal transfer layer disappears, the resin member and the thermal transfer layer are integrated, and a more excellent adhesive strength can be obtained.

A thickness of the mixed layer can be appropriately determined according to conditions of the heat welding and the type of the resin or the thermal transfer layer contained in the resin member. The thickness of the mixed layer is preferably 1.5 nm or more, and more preferably 2.0 nm or more.

In the laminate according to the embodiment of the present invention, the thickness of the thermal transfer layer is preferably 0.001 µm to 20 µm, more preferably 0.01 µm to 15 µm, still more preferably 0.5 µm to 10 µm, and particularly preferably 0.7 µm to 10 µm.

EXAMPLES

Hereinafter, the present invention will be specifically described with reference to Examples, but the present invention is not limited to these Examples.

Example 1

(Thermal Transfer Sheet)

(Fine Resin FR-105 (methoxymethylated polyamide resin) manufactured by Namariichi Co., Ltd./ARUFON (registered trademark) UC-3000 (carboxyl group-containing acrylic oligomer) manufactured by Toagosei Co., Ltd. (mass ratio: 100/2 mixture)) was dissolved in a mixed solvent of ethanol (EtOH)/water/isopropanol (IPA)=60 mass %/10 mass %/30 mass % at 60° C. to prepare a 20 mass % solution (a composition for forming a thermal transfer layer).

The prepared composition for forming a thermal transfer layer was filtered through a nylon mesh having an opening of 188 µm, then coated on a release sheet (OT-P2171: biaxially stretched polypropylene film (OPP) manufactured by Toyobo Co., Ltd., thickness: 30 µm) with a bar coater, air-dried, and further dried at 100° C. for 1 minute in a constant temperature dryer to prepare a thermal transfer sheet including a thermal transfer layer on the release sheet.

<Glass Transition Temperature (Tg)>

A storage elastic modulus and a loss elastic modulus of the release sheet were measured, a value of tan δ (E" (loss elastic modulus)/E' (storage elastic modulus)) was calculated, and a peak temperature of tan δ on a low temperature side was taken as a glass transition temperature (Tg).

<Melting Point (Tm)>

The storage elastic modulus and the loss elastic modulus of the release sheet were measured, a value of tan δ (E" (loss elastic modulus)/E' (storage elastic modulus)) was calculated, and a peak temperature of tan δ on a high temperature side was taken as a melting point (Tm).

A melting point (T1) of a thermoplastic resin was measured by the same method.

In a case of an amorphous resin, since the amorphous resin has no melting points, a decomposition temperature was regarded as the melting point.

(Measurement of Storage Elastic Modulus and Loss Elastic Modulus)

The release sheet was cut into strips having a length of 10 mm (measurement length)×a width of 5 mm with a cutter knife, and the storage elastic modulus/loss elastic modulus at 25° C. to 500° C. was measured using a solid viscoelasticity measurement device (RSAIII, manufactured by TA Instruments Co., Ltd.). Measurement conditions were set to a frequency of 1 Hz and a temperature increase rate of 5° C./min.

(Tensile Test)

The release sheet was subjected to a tensile test using a tensile tester equipped with a constant temperature bath under the following test conditions, and presence or absence of a yield point, an elongation at break, and an inclination of a plastic deformation region after 50% elongation from an inflection point of an elastic deformation region and the plastic deformation region in a stress-strain curve were measured or calculated.

Test apparatus: AG-X 200N manufactured by Shimadzu Corporation

Sample piece: A punched piece of dumbbell No. 1 was used.

Tensile rate: 200 mm/min

Distance between gauge lines: 40 mm

Preheating: In the constant temperature bath set at a molding temperature Tβ° C. or Tα° C. represented by the following equation (1), the sample piece was set between chucks, and after a door was closed and the temperature in the bath was stabilized (after about 10 minutes had elapsed), the test was started.

$$T\alpha°\ C.=\text{glass transition temperature of a release sheet } (Tg)°\ C.+70°\ C. \quad (1).$$

<Thickness of Thermal Transfer Layer>

A thickness of the thermal transfer layer was measured by a dial gauge (GC-9 manufactured by Peacock). A thickness of the thermal transfer sheet was measured, a thickness of the release sheet from which the thermal transfer layer was removed at that point was measured, and a difference between these thicknesses was taken as the thickness of the thermal transfer layer. An average thickness is an average value obtained by measuring 10 points. The unit of the thickness in the table is μm.

(Laminate (1))

A side of the thermal transfer layer of the thermal transfer sheet prepared as described above was superimposed on a twill carbon fiber reinforced thermosetting epoxy resin (C-EpTS) (width 200 mm×length 200 mm×thickness 2 mm) as a resin member, and pressed at a molding temperature Tβ° C. shown in Table 1 to prepare a flat plate-shaped laminate (1).

(Bonded Structure)

Figure 6:
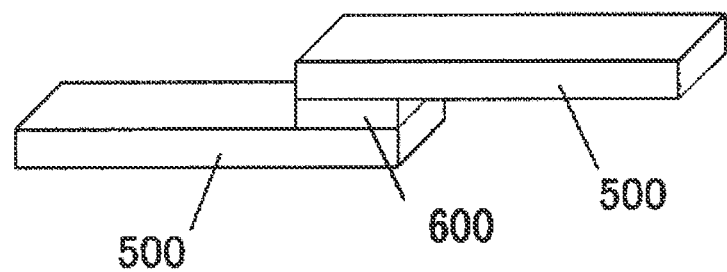
FIG. 6 is a schematic perspective view of a bonded structure used for an evaluation of a shear adhesive strength.

After respective release sheets of two laminates (1) (laminates 500) prepared as described above were peeled off, the laminates (1) (laminates 500) were bonded in the form of FIG. 6 using an adhesive sheet 600 such that sides of respective thermal transfer layers were bonded to each other, thereby obtaining a bonded structure. As the adhesive sheet, a rubber-modified epoxy adhesive sheet described in JP-A-2012-197427 was used for adhesion. An adhesive area was set to 25 mm×10 mm. Curing conditions of the adhesive were set to 150° C. for 20 minutes.

<Evaluation of Shear Adhesive Strength>

A tensile shear adhesive strength between the two laminate members in the bonded structure was measured by a tensile tester (manufactured by Minebea Co., Ltd.; model number: TG-100 kN). The measurement was performed at 25° C. at a tensile rate of 5 mm/min. The obtained measurement value was converted into per unit area to obtain a shear adhesive strength.

(Coated Article)

After the release sheet of the laminate (1) prepared as described above was peeled off, a "body pen" acrylic coating material (for automobile) manufactured by SOFT99 Corporation was coated to the thermal transfer layer by spraying, and the thermal transfer layer was dried at room temperature all day and night to prepare a coated article including a coating film having a thickness of 50 μm.

<Evaluation of Coating Adhesion>

The coated article was cut into strips having a width of about 4 mm, subjected to cross-cut evaluation by a cross-cut method described in JIS K5600-5-6, and evaluated as coating adhesion.

Cut interval: 2 mm

Number of cross-cuts: 100 mass

Release tape: (Nichiban) Cellophane tape 24 mm width (Laminate (2))

In order to evaluate an appearance defect due to wrinkles caused by the release sheet, a laminate (2) was formed with a smartphone casing mold.

Specifically, the side of the thermal transfer layer of the thermal transfer sheet prepared as described above was superimposed on a twill carbon fiber reinforced thermosetting epoxy resin (C-EpTS) (width 100 mm×length 170 mm×thickness 1 mm) as a resin member, and was press molded at a molding temperature Tβ° C. shown in Table 1 to prepare the laminate (2).

The smartphone casing had a size of 70 mm in width and 140 mm in length, and a corner portion of the casing had a curvature radius in a height direction of R=5 mm, a curvature radius in a plane direction of R=5 mm, and an aperture depth of 10 mm.

<Appearance Evaluation>

An appearance of the laminate (2) in a planar shape and a curved surface shape was visually observed and evaluated according to the following criteria.

As for the appearance in the planar shape, a case where wrinkles caused by the release sheet were formed on a flat portion of the laminate (2) was evaluated as "B", and a case where the laminate could be formed without any wrinkles was evaluated as "A".

As for the appearance in the curved surface shape, a case where wrinkles caused by the release sheet were formed at a corner portion of the laminate (2), and a case where tearing of the release sheet or thinning or breaking due to local elongation of the release sheet at a lower portion of a side surface occurred although no wrinkles were formed were evaluated as "B", and a case where the laminate could be formed without any wrinkles was evaluated as "A".

As for pinholes, it was determined that a case where even one void-like appearance defect was confirmed was evaluated as "B", and a case where no void-like appearance defects were formed was evaluated as "A".

Examples 2 to 16 and Comparative Examples 3 to 5

A thermal transfer sheet, the laminate (1), a bonded structure, a coated article, and the laminate (2) were prepared in the same manner as in Example 1 except that the thermal transfer layer, the release sheet, the resin member, and the molding temperature Tβ° C. were changed as shown in Tables 1 and 2, and each measurement and each evaluation were performed in the same manner as in Example 1.

Example 1 and Examples 5 to 7 are different from each other in the thickness of the thermal transfer layer. Example 1 and Example 8 use the same thermal transfer sheet, and are different in the molding temperature Tβ° C. Example 3 and Example 10 use the same thermal transfer sheet, and are different in the molding temperature Tβ° C. Example 4 and Example 9 use the same thermal transfer sheet, and are different in the molding temperature Tβ° C. Examples 12 to 14 use the same thermal transfer sheet, and are different in the molding temperature Tβ° C.

<Curing Temperature (T2) of Thermosetting Resin>

5 mg of the thermosetting resin before curing was cut out, and DSC (differential scanning calorimetry) measurement was performed.

Apparatus: high-sensitivity DSC Q2000 manufactured by TA Instruments

Atmospheric gas: $N_2$ (50 ml/min)

Temperature rising rate: 2° C./min

Temperature condition: from −30° C. to 300° C.

A peak temperature of an exothermic curve associated with the curing at the time of measurement under the above conditions was taken as a curing temperature (T2).

Comparative Examples 1 to 2

In Comparative Examples 1 and 2, the thermal transfer layer of the thermal transfer sheet was not installed, and press working was performed while the release sheet was superimposed on the resin member. Thereafter, the release sheet was removed, and a bonded structure was prepared in the same manner as in Example 1 using a resin member which has no thermal transfer layers after press working, and a shear adhesive strength was evaluated.

Further, a coated article including a coating film having a thickness of 50 μm was prepared by coating a "body pen" acrylic coating material (for automobile) manufactured by SOFT99 Corporation to a resin member which has no thermal transfer layers after press working with a spray directly, and coating adhesion was evaluated.

The thermal transfer layer of the thermal transfer sheet was not installed, and molding was performed with a smartphone casing mold while the release sheet was superimposed on the resin member, and the appearance was evaluated.

The evaluation results of Examples 1 to 16 and Comparative Examples 1 to 5 are shown in Tables 1 and 2 below.

Figure 7:
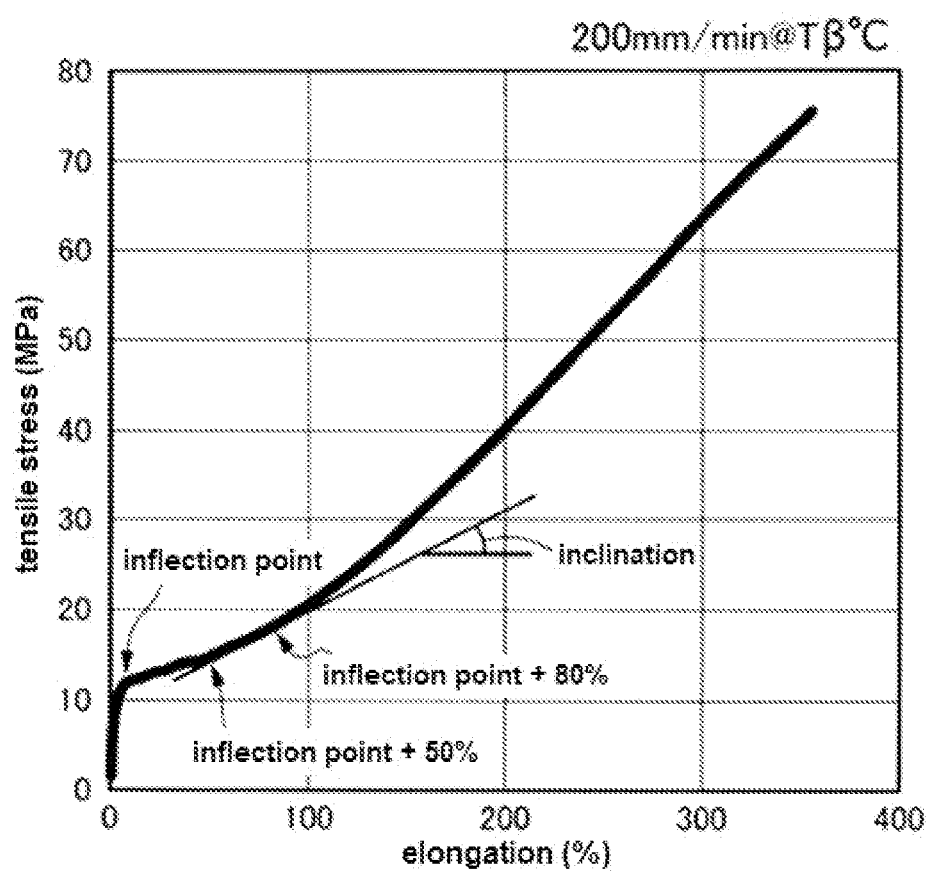
FIG. 7 is a stress-strain curve measured by a tensile test at a molding temperature Tβ° C. for a release sheet in Example 2.

FIG. 7 shows a stress-strain curve measured by the tensile test at the molding temperature Tβ° C. for the release sheet in Example 2.

As shown in FIG. 7, the stress-strain curve has no yield points. The elongation at break was 357%. Further, as the inclination "a" of the plastic deformation region after 50% elongation from the inflection point of the elastic deformation region and the plastic deformation region, an inflection point is present at the time of transition from the elastic region to the plastic region, and the inclination "a" is obtained by the following equation (i) with a starting point being a point 50% after the inflection point, and the obtained value is 13.7.

$$a=((S2-S1)/(E2-E1))\times 100 \quad (i)$$

E1: (Elongation at inflection point+50) (%)
E2: ((Elongation at inflection point+50)+30) (%)
S1: Stress (MPa) at (elongation at inflection point+50) (%)
S2: Stress (MPa) at ((elongation at inflection point+50)+30) (%)

Figure 8:
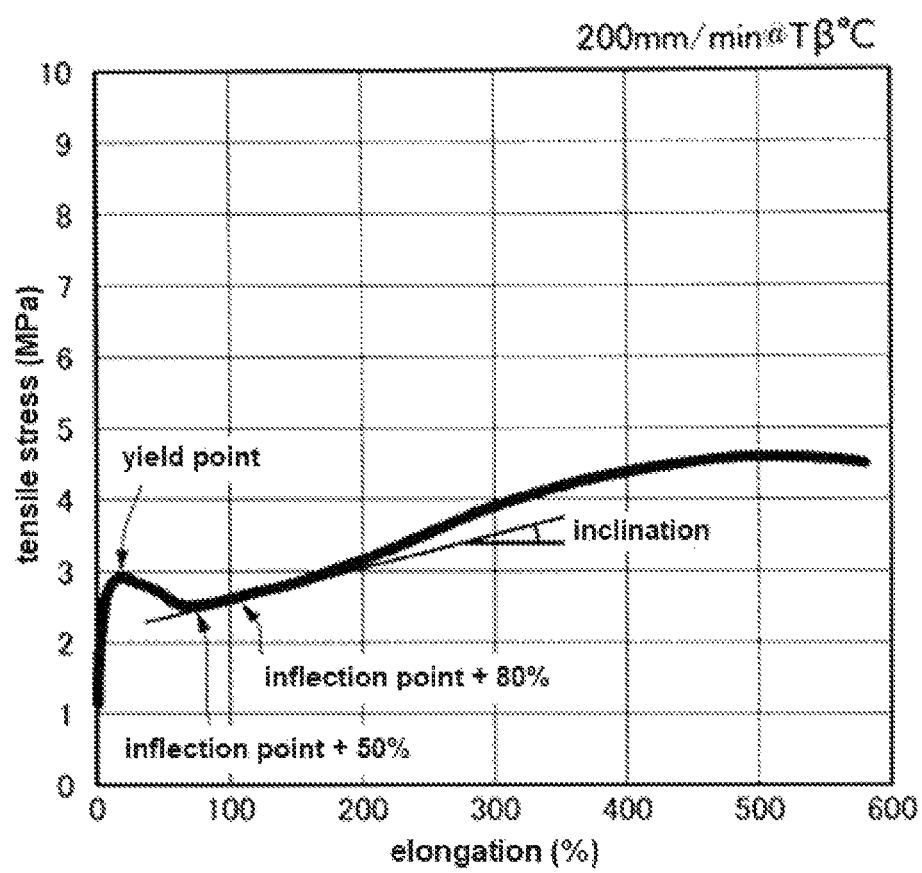
FIG. 8 is a stress-strain curve measured by a tensile test at a molding temperature Tβ° C. for a release sheet in Comparative Example 5.

FIG. 8 shows a stress-strain curve measured by the tensile test at the molding temperature Tβ° C. for the release sheet in Comparative Example 5.

As shown in FIG. 8, the stress-strain curve has a yield point. The elongation at break was 580%. Further, the inclination "a" of the plastic deformation region after 50% elongation from the inflection point of the elastic deformation region and the plastic deformation region is 0.3.

TABLE 1

|  |  |  | Example 1 | Example 2 | Example 3 | Example 4 |
|---|---|---|---|---|---|---|
| Thermal Transfer Layer | Polymer | FR-105 (Methoxymethylated PA) | 100 | 100 | 100 | 100 |
|  |  | UC-3000 (Acrylic Oligomer) | 2 | 2 | 2 | 2 |
|  | Solid Content |  | 20% | 20% | 20% | 20% |
|  | Solvent | EtOH/Water/IPA | 60/10/30 | 60/10/30 | 60/10/30 | 60/10/30 |
|  | Thickness |  | 10 | 10 | 10 | 10 |
| Release Sheet | Type |  | Biaxially Stretched PP | Unstretched PA6 | Unstretched PA66 | Cast PTFE |
|  | Product Number |  | OT-P2171 | V01 | R08 | CF200 |
|  | Thickness |  | 30 | 50 | 50 | 50 |
|  | Tg (tanδ) |  | 52 | 74 | 85 | 124 |
|  | Tm (tanδ) |  | 155 | 213 | 252 | 328 |
|  | Tα° C. = Tg + 70° C. |  | 122° C. | 144° C. | 155° C. | 194° C. |
|  | Yield Point (@Tα° C.) |  | No | No | No | No |
|  | Elongation at Break (@Tα° C.) |  | 318% | 357% | 402% | 266% |
|  | Inclination of Plastic Region (@Tα° C.) |  | 23.0 | 13.8 | 15.2 | 7.0 |
|  | Molding Temperature (Tβ° C.) |  | 120° C. | 150° C. | 150° C. | 200° C. |
|  | Yield Point (@Tβ° C.) |  | No | No | No | No |
|  | Elongation at Break (@Tβ° C.) |  | 318% | 360% | 397% | 271% |
|  | Inclination of Plastic Region (@Tβ° C.) |  | 23.0 | 13.7 | 15.5 | 7.0 |
| Manufacturing Method | Resin Member |  | C-EpTS | C-EpTS | C-EpTS | C-EpTP |
|  | Molding Method |  | Press Molding | Press Molding | Press Molding | Press Molding |
|  | Molding Temperature (T° C.) |  | 120° C. | 150° C. | 150° C. | 200° C. |
| Appearance | Planar Shape (Wrinkle) |  | A | A | A | A |
|  | Curved Surface Shape (Wrinkle, Tear) |  | A | A | A | A |
|  | Pinhole |  | A | A | A | A |
| Adhesiveness | Shear Adhesive Strength |  | 18.2 MPa | 19.1 MPa | 18.8 MPa | 23.7 MPa |
|  |  | Peeling Mode | Cohesive Failure | Cohesive Failure | Cohesive Failure | Cohesive Failure |

TABLE 1-continued

|  |  |  | Example 5 | Example 6 | Example 7 | Example 8 |
|---|---|---|---|---|---|---|
|  | Coating Adhesion | Number of Peeling Points (per 100) | 0 | 0 | 0 | 0 |
| Thermal Transfer Layer | Polymer | FR-105 (Methoxymethylated PA) | 100 | 100 | 100 | 100 |
|  |  | UC-3000 (Acrylic Oligomer) | 2 | 2 | 2 | 2 |
|  | Solid Content |  | 20% | 20% | 20% | 20% |
|  | Solvent | EtOH/Water/IPA | 60/10/30 | 60/10/30 | 60/10/30 | 60/10/30 |
|  | Thickness |  | 1 | 20 | 40 | 10 |
| Release Sheet | Type |  | Biaxially Stretched PP | Biaxially Stretched PP | Biaxially Stretched PP | Biaxially Stretched PP |
|  | Product Number |  | OT-P2171 | OT-P2171 | OT-P2171 | OT-P2171 |
|  | Thickness |  | 30 | 30 | 30 | 30 |
|  | Tg (tanδ) |  | 52 | 52 | 52 | 52 |
|  | Tm (tanδ) |  | 155 | 155 | 155 | 155 |
|  | Tα° C. = Tg + 70° C. |  | 122° C. | 122° C. | 122° C. | 122° C. |
|  | Yield Point (@Tα° C.) |  | No | No | No | No |
|  | Elongation at Break (@Tα° C.) |  | 318% | 318% | 318% | 318% |
|  | Inclination of Plastic Region (@Tα° C.) |  | 23.0 | 23.0 | 23.0 | 23.0 |
|  | Molding Temperature (Tβ° C.) |  | 120° C. | 120° C. | 120° C. | 150° C. |
|  | Yield Point (@Tβ° C.) |  | No | No | No | No |
|  | Elongation at Break (@Tβ° C.) |  | 318% | 318% | 318% | 481% |
|  | Inclination of Plastic Region (@Tβ° C.) |  | 23.0 | 23.0 | 23.0 | 11.5 |
| Manufacturing Method | Resin Member |  | C-EpTS | C-EpTS | C-EpTS | C-EpTS |
|  | Molding Method |  | Press Molding | Press Molding | Press Molding. | Press Molding |
|  | Molding Temperature (T° C.) |  | 120° C. | 120° C. | 120° C. | 150° C. |
| Appearance | Planar Shape (Wrinkle) |  | A | A | A | A |
|  | Curved Surface Shape (Wrinkle, Tear) |  | A | A | A | A |
|  | Pinhole |  | A | A | A | A |
| Adhesiveness | Shear Adhesive Strength | Peeling Mode | 18.4 MPa Cohesive Failure | 18.2 MPa Cohesive Failure | 18.2 MPa Cohesive Failure | 18.8 MPa Cohesive Failure |
|  | Coating Adhesion | Number of Peeling Points (per 100) | 0 | 0 | 0 | 0 |

|  |  |  |  | Example 9 | Example 10 | Example 11 |
|---|---|---|---|---|---|---|
| Thermal Transfer Layer | Polymer | FR-105 (Methoxymethylated PA) |  | 100 | 100 | 100 |
|  |  | UC-3000 (Acrylic Oligomer) |  | 2 | 2 | 2 |
|  | Solid Content |  |  | 20% | 20% | 20% |
|  | Solvent | EtOH/Water/IPA |  | 60/10/30 | 60/10/30 | 60/10/30 |
|  | Thickness |  |  | 10 | 10 | 10 |
| Release Sheet | Type |  |  | Cast PTFE | Unstretched PA66 | Unstretched ETFE |
|  | Product Number |  |  | CF200 | R08 | ETFE MR |
|  | Thickness |  |  | 50 | 50 | 50 |
|  | Tg (tanδ) |  |  | 124 | 85 | 100 |
|  | Tm (tanδ) |  |  | 328 | 252 | 250 |
|  | Tα° C. = Tg + 70° C. |  |  | 194° C. | 155° C. | 170° C. |
|  | Yield Point (@Tα° C.) |  |  | No | No | No |
|  | Elongation at Break (@Tα° C.) |  |  | 266% | 402% | 476% |
|  | Inclination of Plastic Region (@Tα° C.) |  |  | 6.9 | 15.2 | 1.2 |
|  | Molding Temperature (Tβ° C.) |  |  | 150° C. | 200° C. | 120° C. |
|  | Yield Point (@Tβ° C.) |  |  | No | No | No |
|  | Elongation at Break (@Tβ° C.) |  |  | 298% | 465% | 398% |
|  | Inclination of Plastic Region (@Tβ° C.) |  |  | 7.2 | 12.7 | 3.0 |

TABLE 1-continued

|  |  |  | | | |
|---|---|---|---|---|---|
| Manufacturing Method | Resin Member Molding Method | | C-EpTS Press Molding | C-EpTP Press Molding | C-EpTS Press Molding |
| | Molding Temperature (T° C.) | | 150° C. | 200° C. | 120° C. |
| Appearance | Planar Shape (Wrinkle) | | A | A | A |
| | Curved Surface Shape (Wrinkle, Tear) | | A | A | A |
| | Pinhole | | A | A | A |
| Adhesiveness | Shear Adhesive Strength | Peeling Mode | 19.2 MPa Cohesive Failure | 23.4 MPa Cohesive Failure | 18.8 MPa Cohesive Failure |
| | Coating Adhesion | Number of Peeling Points (per 100) | 0 | 0 | 0 |

TABLE 2

|  |  |  | Example 12 | Example 13 | Example 14 | Example 15 |
|---|---|---|---|---|---|---|
| Thermal Transfer Layer | Polymer | FR-105 (Methoxymethylated PA) | 100 | 100 | 100 | 100 |
| | | UC-3000 (Acrylic Oligomer) | 2 | 2 | 2 | 2 |
| | Solid Content | | 20% | 20% | 20% | 20% |
| | Solvent | EtOH/Water/IPA | 60/10/30 | 60/10/30 | 60/10/30 | 60/10/30 |
| | Thickness | | 10 | 10 | 10 | 10 |
| Release Sheet | Type | | Easily-molded PET | Easily-molded PET | Easily-molded PET | Easily-molded PET |
| | Product Number | | G930E50 | G930E50 | G930E50 | G980E50 |
| | Thickness | | 50 | 50 | 50 | 50 |
| | Tg (tanδ) | | 75 | 75 | 75 | 75 |
| | Tm (tanδ) | | 216 | 216 | 216 | 245 |
| | Tα° C. = Tg + 70° C. | | 145° C. | 145° C. | 145° C. | 145° C. |
| | Yield Point (@Tα° C.) | | No | No | No | No |
| | Elongation at Break (@Tα° C.) | | 158% | 158% | 158% | 142% |
| | Inclination of Plastic Region (@Tα° C.) | | 16.1 | 16.1 | 16.1 | 47.3 |
| | Molding Temperature (Tβ° C.) | | 120° C. | 150° C. | 180° C. | 180° C. |
| | Yield Point (@Tβ° C.) | | No | No | No | No |
| | Elongation at Break (@Tβ° C.) | | 170% | 162% | 175% | 160% |
| | Inclination of Plastic Region (@Tβ° C.) | | 20.6 | 15.6 | 9.1 | 37.5 |
| Manufacturing Method | Resin Member Molding Method | | C-EpTS Press Molding | C-EpTS Press Molding | C-EpTS Press Molding | C-EpTS Press Molding |
| | Molding Temperature (T° C.) | | 120° C. | 150° C. | 180° C. | 180° C. |
| Appearance | Planar Shape (Wrinkle) | | A | A | A | A |
| | Curved Surface Shape (Wrinkle, Tear) | | A | A | A | A |
| | Pinhole | | A | A | A | A |
| Adhesiveness | Shear Adhesive Strength | Peeling Mode | 18.8 MPa Cohesive Failure | 19.1 MPa Cohesive Failure | 18.7 MPa Cohesive Failure | 18.7 MPa Cohesive Failure |
| | Coating Adhesion | Number of Peeling Points (per 100) | 0 | 0 | 0 | 0 |

|  |  |  | Example 16 | Comparative Example 1 | Comparative Example 2 | Comparative Example 3 |
|---|---|---|---|---|---|---|
| Thermal Transfer Layer | Polymer | FR-105 (Methoxymethylated PA) | 100 | No | No | 100 |
| | | UC-3000 (Acrylic Oligomer) | 2 | No | No | 2 |
| | Solid Content | | 20% | — | — | 20% |
| | Solvent | EtOH/Water/IPA | 60/10/30 | — | — | 60/10/30 |
| | Thickness | | 10 | — | — | 10 |

TABLE 2-continued

| | | | | | | |
|---|---|---|---|---|---|---|
| Release Sheet | Type | | Biaxially Stretched PET | Biaxially Stretched PP | Unstretched PA66 | Biaxially Stretched PP |
| | Product Number | | MRF | OT-P2171 | R08 | FMN-50WD |
| | Thickness | | 25 | 30 | 50 | 50 |
| | Tg (tanδ) | | 117 | 52 | 85 | 108 |
| | Tm (tanδ) | | 233 | 155 | 252 | 238 |
| | Tα° C. = Tg + 70° C. | | 187° C. | 122° C. | 155° C. | 178° C. |
| | Yield Point (@Tα° C.) | | No | No | No | No |
| | Elongation at Break (@Tα° C.) | | 112% | 318% | 402% | 85% |
| | Inclination of Plastic Region (@Tα° C.) | | 97.9 | 23.0 | 15.2 | 102 |
| | Molding Temperature (Tβ° C.) | | 220° C. | 120° C. | 200° C. | 200° C. |
| | Yield Point (@Tβ° C.) | | No | No | No | No |
| | Elongation at Break (@Tβ° C.) | | 106% | 318% | 465% | 89% |
| | Inclination of Plastic Region (@Tβ° C.) | | 48.0 | 23.0 | 12.7 | 97.8 |
| Manufacturing Method | Resin Member | | C-EpTP | C-EpTS | C-EpTP | C-EpTP |
| | Molding Method | | Press Molding | Press Molding | Press Molding | Press Molding |
| | Molding Temperature (T° C.) | | 220° C. | 120° C. | 200° C. | 200° C. |
| Appearance | Planar Shape (Wrinkle) | | A | A | A | A |
| | Curved Surface Shape (Wrinkle, Tear) | | A | A | A | B (Wrinkle, Tear) |
| | Pinhole | | A | B | B | A |
| Adhesiveness | Shear Adhesive Strength | Peeling Mode | 23.7 MPa Cohesive Failure | 4.8 MPa Interface Failure | 5.7 MPa Interface Failure | 23.2 MPa Cohesive Failure |
| | Coating Adhesion | Number of Peeling Points (per 100) | 0 | 100 | 95 | 0 |

| | | | Comparative Example 4 | Comparative Example 5 |
|---|---|---|---|---|
| | Thermal Transfer Layer | Polymer | | |
| | | FR-105 (Methoxymethylated PA) | 100 | 100 |
| | | UC-3000 (Acrylic Oligomer) | 2 | 2 |
| | | Solid Content | 20% | 20% |
| | | Solvent EtOH/Water/IPA | 60/10/30 | 60/10/30 |
| | | Thickness | 10 | 10 |
| | Release Sheet | Type | Cutting PTFE | PMP |
| | | Product Number | No. 900UL | TPX 88BMT4 |
| | | Thickness | 50 | 50 |
| | | Tg (tanδ) | 123 | 45 |
| | | Tm (tanδ) | 321.1 | 212 |
| | | Tα° C. = Tg + 70° C. | 193° C. | 115° C. |
| | | Yield Point (@Tα° C.) | Yes | Yes |
| | | Elongation at Break (@Tα° C.) | 428% | 628% |
| | | Inclination of Plastic Region (@Tα° C.) | 5.0 | −0.1 |
| | | Molding Temperature (Tβ° C.) | 200° C. | 150° C. |
| | | Yield Point (@Tβ° C.) | Yes | Yes |
| | | Elongation at Break (@Tβ° C.) | 440% | 580% |
| | | Inclination of Plastic Region (@Tβ° C.) | 5.0 | 0.3 |
| | Manufacturing Method | Resin Member | C-EpTP | C-EpTS |
| | | Molding Method | Press Molding | Press Molding |
| | | Molding Temperature (T° C.) | 200° C. | 150° C. |
| | Appearance | Planar Shape (Wrinkle) | B (Wrinkle) | B (Wrinkle) |
| | | Curved Surface Shape (Wrinkle, Tear) | B (Cut) | B (Cut) |
| | | Pinhole | A | A |

TABLE 2-continued

|  |  |  |  | 23.7 MPa Cohesive Failure | 18.4 MPa Cohesive Failure |
|---|---|---|---|---|---|
| Adhesiveness | Shear Adhesive Strength | | Peeling Mode | | |
| | Coating Adhesion | | Number of Peeling Points (per 100) | 0 | 0 |

The release sheets shown in the tables are as follows.

OT-P2171: biaxially stretched polypropylene film (OPP) manufactured by Toyobo Co., Ltd.

V-01: unstretched polyamide 6 film (PA6) manufactured by Xiamen Xinwang New Material Technology Co., Ltd.

R-08: unstretched polyamide 66 film (PA66) manufactured by Xiamen Xinwang New Material Technology Co., Ltd.

CF200: cast molded polytetrafluoroethylene film (cast PTFE) manufactured by Textiles Coated International Co., Ltd.

ETFE MR: unstretched extrusion-molded ethylene-tetrafluoroethylene copolymer film (unstretched ETFE) manufactured by Textiles Coated International Co., Ltd.

MRF: biaxially stretched polyethylene terephthalate film (PET)/silicone treatment) (PET/silicone treatment) manufactured by Mitsubishi Chemical Co., Ltd.

NITOFLON NO. 900UL: cutting molded polytetrafluoroethylene film (cutting PTFE) manufactured by Nitto Denko Corporation G930E50: easily molded polyethylene terephthalate (easily molded PET) manufactured by Mitsubishi Chemical Co., Ltd.

G980E50: easily molded polyethylene terephthalate (easily molded PET) manufactured by Mitsubishi Chemical Co., Ltd.

TPX 88BMT4: unstretched polymethyl pentene film (PMP) manufactured by Mitsui Chemicals Co., Ltd.

FMN-50WD: biaxially stretched polyethylene terephthalate film (PET/silicone treatment) manufactured by Fujiko Co., Ltd.

With respect to the MRF and FMN-50WD, a thermal transfer layer was applied to a silicone-treated surface.

With respect to the OT-P2171, CF200, ETFE MR, NITOFLON No. 900UL, and TPX 88BMT4, a thermal transfer layer was applied in an untreated state.

The other release sheets were subjected to a silicone treatment on one surface, and a thermal transfer layer was applied to a silicone-treated surface.

The resin members shown in the tables are as follows.

C-EpTP: unidirectional long fiber carbon fiber reinforced thermoplastic epoxy resin C-EpTS: twill carbon fiber reinforced thermosetting epoxy resin In Examples 1 to 16, the release sheet had no yield points in the tensile test, and the elongation at break was in the range of 100% to 600%, and thus the appearance of the laminate was good, so that the thermal transfer layer was firmly adhered to the resin member and a uniform and smooth thermal transfer layer could be formed. Therefore, a coated article having good coating adhesion and a bonded structure having good adhesiveness could be obtained.

On the other hand, in Comparative Examples 1 and 2, the release sheet had a predetermined stress-strain curve, but there is no thermal transfer layer, and thus good coating adhesion and adhesiveness could not be obtained.

In Comparative Example 3, the release sheet had no yield points in the tensile test, but the elongation at break was small, and thus wrinkles and tears occurred at the corner portion.

In Comparative Examples 4 and 5, the release sheet had a yield point in the tensile test, and thus local elongation occurred, and the release sheet was thin at the lower portion of the corner portion and was scraped off.

Although preferred embodiments of the present invention have been described above, the present invention is not limited to the above embodiments, and various modifications and substitutions can be added to the above embodiments without departing from the scope of the present invention.

REFERENCE SIGNS LIST

10 Thermal transfer layer
20 Release sheet
30 Coating film
40 Adhesive layer
50 Adherend
100 Resin member
200 Thermal transfer sheet
300 Coated article
400 Bonded structure
500 Laminate
600 Adhesive sheet

The invention claimed is:

1. A method for manufacturing a laminate, comprising:
a laminating step of laminating a side of a thermal transfer layer of a thermal transfer sheet having a release sheet and the thermal transfer layer on at least a part of a surface of a resin member by heat bonding, wherein
the release sheet has no yield points, and has an elongation at break of 100% to 600% in a stress-strain curve measured by a tensile test at a molding temperature $T\beta°$ C. in the laminating step, and
the release sheet has an inclination of a plastic deformation region after 50% elongation from an inflection point of an elastic deformation region and the plastic deformation region of 5.0 to 50 in the stress-strain curve measured by the tensile test at the molding temperature $T\beta°$ C.

2. The method for manufacturing a laminate according to claim 1, wherein
the release sheet has no yield points, and has an elongation at break of 150% to 600% in the stress-strain curve measured by the tensile test at the molding temperature $T\beta°$ C. in the laminating step.

3. The method for manufacturing a laminate according to claim 1, wherein
the thermal transfer layer has an average thickness of 0.1 μm to 50 μm.

4. The method for manufacturing a laminate according to claim 1, wherein
in the laminating step, the heat bonding is performed by heat pressing.

5. A method for manufacturing a coated article, comprising:
- a coating film forming step of peeling off the release sheet from a laminate obtained by the method for manufacturing a laminate according to claim 1, and forming a coating film on the thermal transfer layer which is exposed.

6. A method for manufacturing a bonded structure, comprising:
- a bonding step of peeling off the release sheet from a laminate obtained by the method for manufacturing a laminate according to claim 1, and bonding an adherend onto the thermal transfer layer which is exposed via an adhesive layer.

* * * * *